United States Patent
Lehmann (10) Patent No.: US 9,823,142 B2
(45) Date of Patent: Nov. 21, 2017

(54) FORCE SENSOR FOR MANUALLY OPERATED OR PNEUMATIC PRESSES (71) Applicant: KISTLER HOLDING AG, Winterthur (CH)

(72) Inventor: Andri Michael Lehmann, Neftenbach (CH)

(73) Assignee: KISTLER HOLDING AG, Winterthur (CH)

( * ) Notice: Subject to any disclaimer, the term of this patent is extended or adjusted under 35 U.S.C. 154(b) by 0 days.

(21) Appl. No.: 15/105,670

(22) PCT Filed: Dec. 15, 2014

(86) PCT No.: PCT/CH2014/000174
§ 371 (c)(1),
(2) Date: Jun. 17, 2016

(87) PCT Pub. No.: WO2015/089680
PCT Pub. Date: Jun. 25, 2015

(65) Prior Publication Data
US 2016/0334287 A1 Nov. 17, 2016

(30) Foreign Application Priority Data
Dec. 20, 2013 (CH) .................................. 2117/13

(51) Int. Cl.
G01L 1/16 (2006.01)
B30B 15/00 (2006.01)
G01L 5/00 (2006.01)

(52) U.S. Cl.
CPC ............ G01L 1/16 (2013.01); B30B 15/0094 (2013.01); G01L 5/0038 (2013.01); G01L 5/0076 (2013.01)

(58) Field of Classification Search
CPC ........... G01B 5/20; G01L 1/16; G01L 5/0038; G01L 5/0076; B30B 15/0094
(Continued)

(56) References Cited

U.S. PATENT DOCUMENTS 4,164,164 A * 8/1979 Trungold ............... F16B 31/028
411/10
4,182,189 A * 1/1980 Dock .................... B23K 20/085
116/DIG. 34

(Continued)

FOREIGN PATENT DOCUMENTS

EP      140066 A1     5/1985
EP     1590641 A1    11/2005
WO  WO 2011/030839 A1   3/2011

OTHER PUBLICATIONS

International Search Report, dated Apr. 23, 2015.

Primary Examiner — Lisa Caputo
Assistant Examiner — Octavia Hollington
(74) Attorney, Agent, or Firm — Dority & Manning, P.A.

(57) ABSTRACT

A force sensor for measuring axially occurring forces in manually operated or pneumatic presses has a central axis and an outer diameter and includes a bolt and a nut that preload between them a piezoelectric force washer with a plug connection. The washer has an inner end face defining a first bore having a first diameter with an internal thread. The bolt defines a throughbore with an internal diameter, a head portion and a hollow shaft defining a frontal external thread extending through the force washer and engaging the nut's internal thread. The nut or the head portion defines a second bore with a second diameter measuring smaller than the shafts internal diameter but at least one quarter of the outer diameter and at least as long as its diameter. The inner wall of the second bore defines a center mount for a sliding fit.

20 Claims, 4 Drawing Sheets (58) Field of Classification Search
USPC .................. 73/760, 856, 866.5, 862.325
See application file for complete search history.

(56) References Cited

U.S. PATENT DOCUMENTS

| | | | |
|---|---|---|---|
| 4,773,272 A * | 9/1988 | Trungold | ............... G01L 5/243 411/10 |
| 7,493,836 B2 | 2/2009 | Wolfer et al. | |
| 7,500,398 B2 * | 3/2009 | Tschanz | ............... G01L 5/0004 73/760 |
| 2007/0034027 A1 | 2/2007 | Wolfer et al. | |

* cited by examiner

Fig. 4 ered or pneumatic presses up to 60 kN which has a lower constructional height but overall low manufacturing costs. In addition, it should also be able to measure forces up to, preferably up to 12 kN.

FORCE SENSOR FOR MANUALLY OPERATED OR PNEUMATIC PRESSES

CROSS-REFERENCE TO RELATED APPLICATIONS

This application claims priority to International Application Serial No. PCT/CH2014/000174, filed Dec. 15, 2014, which claims priority to Swiss Application No. 2117/13, filed Dec. 20, 2013. International Application Serial No. PCT/CH2014/000174 is hereby incorporated herein in its entirety for all purposes by this reference.

FIELD OF THE INVENTION

The invention relates to a force sensor having a lower and an upper annular bearing surface and an outer diameter $D_A$ for measuring axially occurring forces in manually operated or pneumatic presses comprising a piezoelectric force washer with a plug connection preloaded between a bolt and a nut wherein said nut has a first bore having a first diameter with an internal thread and wherein said bolt has a head portion as well as a hollow preloading shank having an inner diameter $D_I$ and having a frontal external thread that extends through the force washer and engages the internal thread of the nut.

BACKGROUND

Force sensors of the type described above are used for a variety of purposes and are sold, for example, under the name of Press Force Sensor.

Examples of such force sensors are described in U.S. Pat. No. 7,493,836, which is hereby incorporated herein by this reference for all purposes. The measuring sensors described therein as being state of the art consist of a commercially available force sensor clamped between a bolt and a nut wherein both the bolt and the nut bear central tap holes on the outer surfaces thereof for the attachment of work pieces. This embodiment requires a considerable constructional height.

As an improved embodiment with regard to constructional height, a device is described in the same document wherein the sensor is directly integrated into the bolt. For attachment to adjoining work pieces there is either provided a central throughbore, several smaller tap holes on the frontal outer surfaces of the bolt and the nut or a central bore with a ledge serving as an internal bearing surface for a screw head of a mounting screw that is passed through the bore. Although the embodiment with the integrated sensor has a lower constructional height, its overall costs are higher as compared to the embodiment with a separate sensor because conventional sensors cannot be used.

Force sensors of this type are used for the measurement of the forces applied by manually operated or pneumatic presses, for example. Since the stroke of such presses is not very high due to the nature of the system, the force sensors employed therein should not be higher than 50 mm for hand presses up to 60 kN, for example. It is also important that the mounting fixtures at both external end faces of the force sensor can be easily adapted to the specifications of the manufacturer of the presses.

SUMMARY OF THE INVENTION

It is an object of the present invention to describe a force sensor with a central axis of the type described above for measuring axially occurring forces in manually operated or pneumatic presses up to 60 kN which has a lower constructional height but overall low manufacturing costs. In addition, it should also be able to measure forces up to, preferably up to 12 kN.

This object is achieved by force sensors as described below.

According to one aspect of the invention, the nut has a second bore having a second diameter that is smaller than the inner diameter $D_I$ of the hollow preloading shank extending through the nut wherein the diameter of the second bore is at least one quarter of the outer diameter of the nut. In addition, the length of the second bore is at least as long as the diameter of the second bore of the nut. Furthermore, according to the invention, the inner surface of the second bore is formed as a center mount for a sliding fit.

In an alternative embodiment, the arrangement of bolt and nut is reversed. In this alternative embodiment, the second bore formed in the head portion of the bolt, but with all of the same features as the second bore described for the nut.

The outer diameter $D_A$ of the force sensor is essentially equal to the outer diameter of the nut, which in turn is essentially of the same size as the outer diameter of the force washer and the bolt.

A device of this type is cost-effective in production because a conventional force washer can be used. As an example, a type 9040A sensor manufactured by the company Kistler Instrumente AG is proposed.

The constructional height is reduced by forming in the nut or the bolt head section, respectively, means for mounting a clamping tool in the form of a center mount for a sliding fit. This is, for example, provided with a tolerance of H7+−8.018 at a diameter of 14 mm to ensure a H7/g6 sliding fit with minimal play. Thus, a tool equipped with a corresponding locating bolt can be arranged in the desired center mount and can be inserted with its bolt in the force sensor in a centered manner. Attachment can be achieved by using a set screw that is accessible from the outside. In this way, mounting and dismounting of the tool is very easy. Furthermore, mounting always ensures a centric and tilt-safe accommodation of the tool.

According to the invention, the locating bolt may have an elongated shape extending far into the bolt of the force sensor because the hollow preloading shank of the force sensor has a larger inner diameter than the second bore. In particular, the locating bolt may extend completely through the force sensor and may bridge the force measurement, if needed, without having to remove the force sensor. In this case, only a displacement measurement is performed.

BRIEF DESCRIPTION OF THE DRAWINGS

In the following, the invention will be explained in more detail with respect to the drawings in which.

DESCRIPTION OF EXEMPLARY EMBODIMENTS OF THE INVENTION

Figure 1:
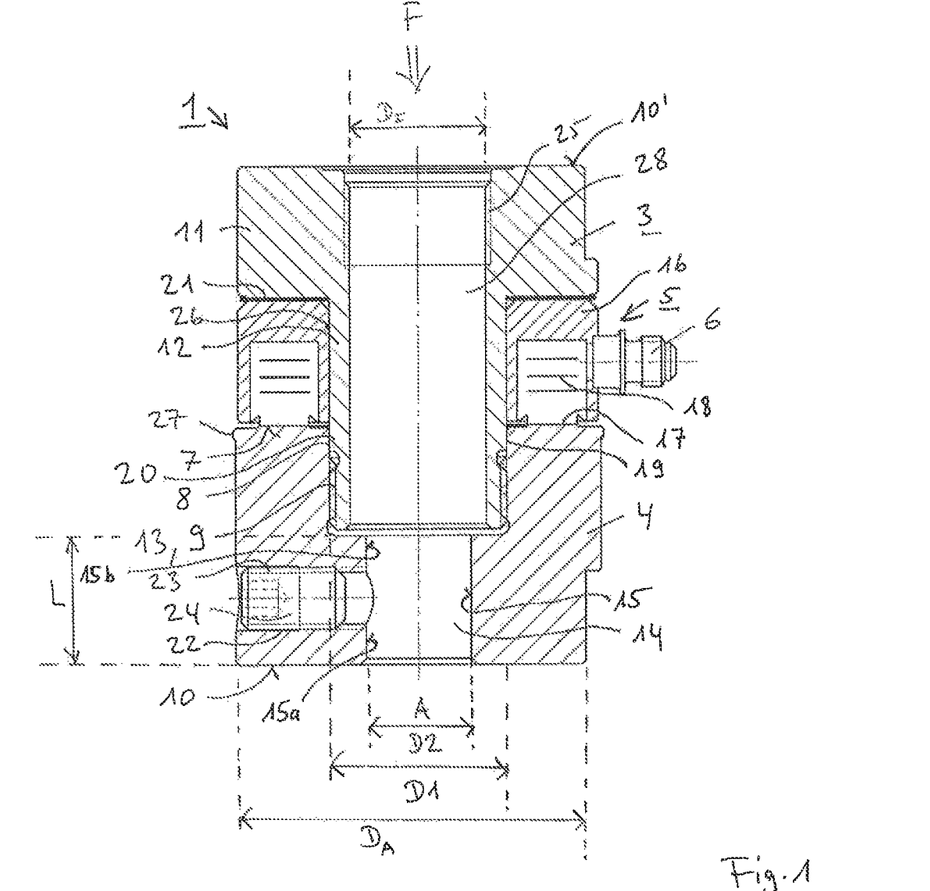
FIG. 1 shows a schematic representation of a force sensor according to the invention in cross section.
Figure 4:
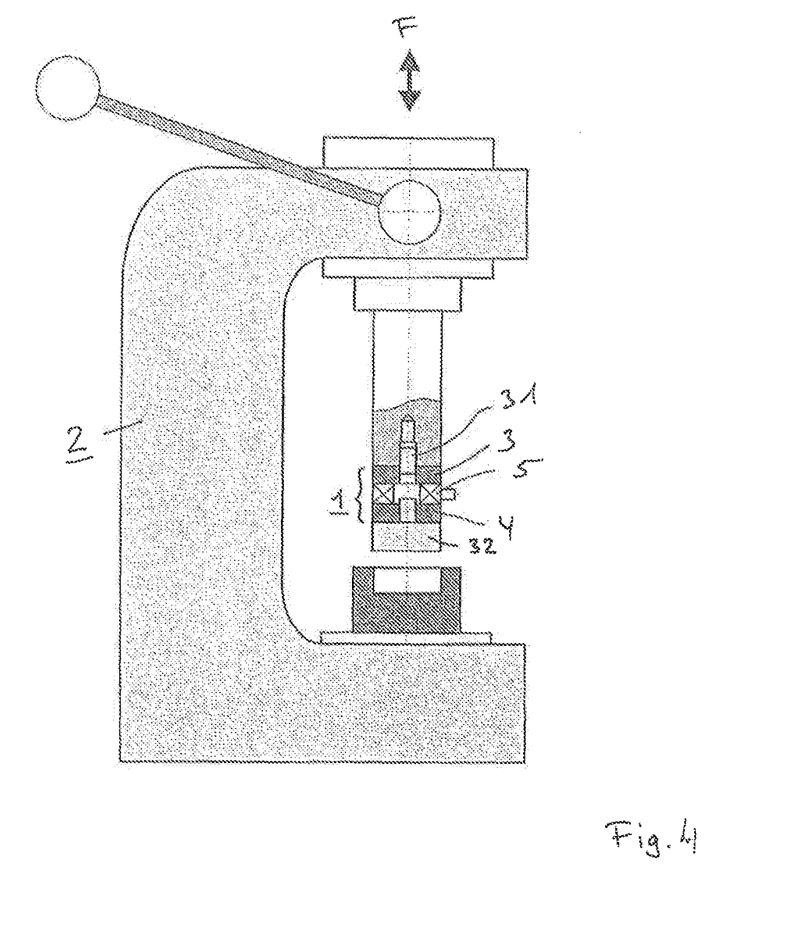
FIG. 4 shows a schematic representation of a hand press including a force sensor according to the invention.

FIG. 1 a shows a force sensor 1 with an outer diameter $D_A$ and having a central axis A for the measurement of axially occurring forces F in manually operated or pneumatic presses 2 as shown in FIG. 4, with a lower and an upper annular bearing surface 10, 10'. The force sensor 1 includes a piezoelectric force washer 5 damped between a bolt 3 and a nut 4 and having a plug connection 6. The outer diameter $D_A$ in the area of the nut 4 is essentially of the same size as in the area of the bolt 3 and the force washer 5.

The nut 4 includes an inner end face 7 with a first bore 8 extending axially from the inner end face 7 and having a first diameter D1 with an internal thread 9. Furthermore, according to a first embodiment of the nut 4, the lower, annular bearing surface 10 of the sensor 1 is defined normal to the central axis A. The bolt 3 includes a head portion 11 as well as a hollow preloading shank 12 with an inner diameter $D_I$ in a central bore 28. The hollow preloading shank 12 further comprises a frontal external thread 13 extending through the force washer 5 and engaging the internal thread 9 of nut 4. According to the invention, in the first embodiment of the invention the nut 4 comprises a second bore 14 having a second diameter D2 that is smaller than the diameter $D_I$ of the hollow preloading shank 12. The second bore 14 is defined extending axially through the nut 4 from the upper annular bearing surface 10 with the diameter D2 of the second bore being at least one quarter of the outer diameter $D_A$ of the nut 4, and the length L of the second bore 14 being at least as long as its diameter D2. Moreover, the inner wall 15 of the second bore 14 is formed as a quality H7 center mount 15 for a H7/g6 sliding fit.

Figure 3:
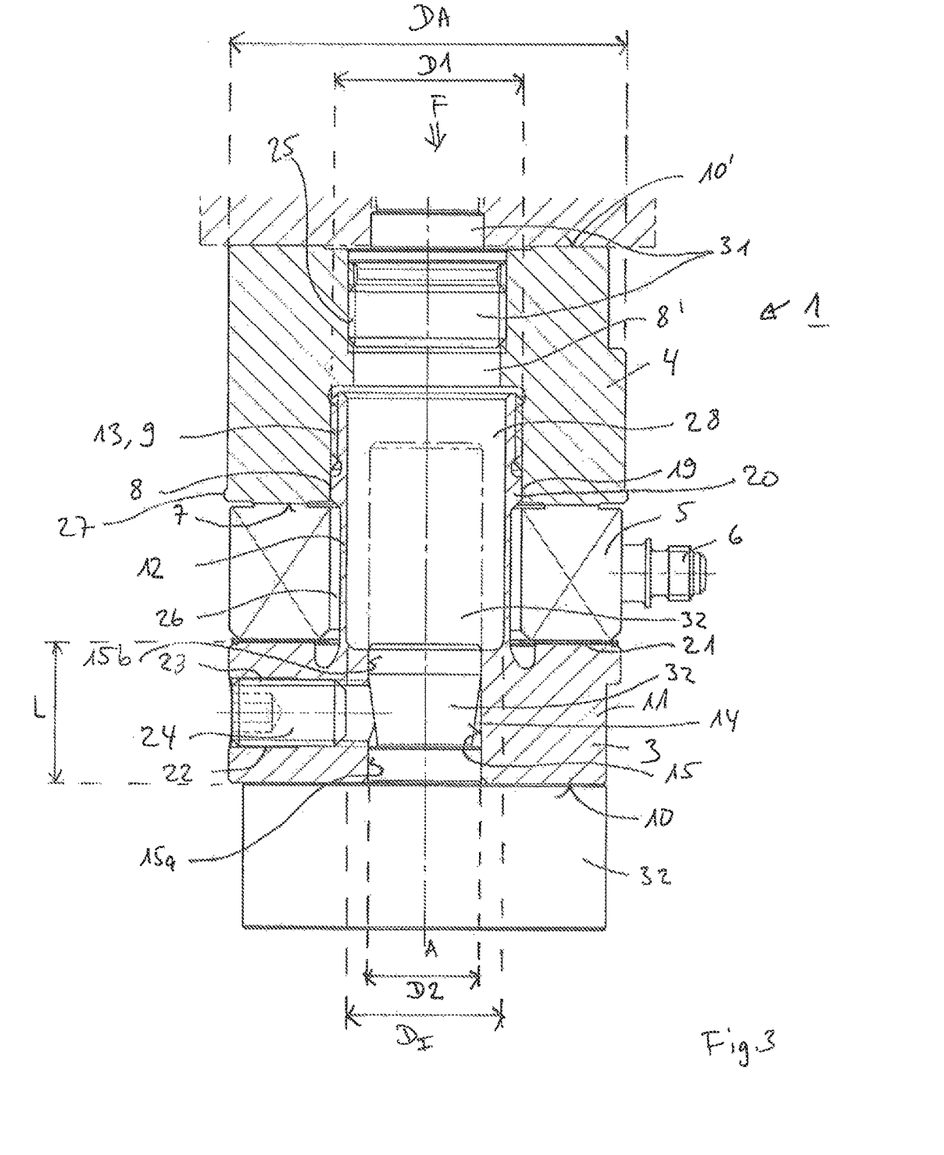
FIG. 3 shows an alternative embodiment of the force sensor according to the invention in schematic representation with locating bolt and damping bolt attached thereto.

An alternative embodiment of the invention is shown in FIG. 3. In contrast to the first variation of the invention shown in FIG. 1, the orientations of the nut 4 and the bolt 3 are reversed: the head portion 11 of the bolt 3 now includes the lower, annular bearing surface 10 of the sensor 1 and also the second bore 14 with all the features mentioned above in connection with FIG. 1, especially with the center mount at the inner wall 15 for a sliding fit and all dimensions and their ratios mentioned.

The piezoelectric force washer 5 is a commercially available prior art sensor. It includes a housing 16 with preloaded piezoelectric measuring elements 18 incorporated therein beneath a membrane 17 and includes a plug connection 6.

In a presently preferred embodiment, the nut 4 additionally comprises an inner surface 19 in the first bore 8 close to the front face 7 that is formed as a quality H7 center mount 19 for an H7/g6 sliding fit. Moreover, as can be seen from FIG. 1, the bolt 3 comprises adjacent to the external thread 13 and facing the head portion 11 a guiding region 20 being at least as wide as thread 13 and accommodated in the center mount 19 of the first bore 8 in the proximity of the inner end face 7 in a centered manner. In this way, centering between the bolt 3 and the nut 4 is ensured. It has been shown that centering which is solely achieved by the threaded connection between the bolt 3 and the nut 4 is insufficient to meet the requirements.

During assembly, the force washer 5 is fixed under a preload, preferably by means of a centering aid that engages the force washer 5 from the outside, subsequently by means of an outer centering to center the hollow preloading shank 12 of the bolt 3 and then by tightening the nut 4 on threads 9, 13 between the bolt 3 and the nut 4. This eliminates the need to incorporate a centering sleeve between the hollow preloading shank 12 and the force washer 5.

As shown in FIGS. 1 and 3 for example, it has proven to be particularly advantageous to place between the force washer 5 and the head portion 11 of the bolt 3, a sliding disk 21, which is fixed by the preload between the force washer 5 and the lower end face of the bolt 3. This sliding disk 21 allows sliding between the two surfaces of the head portion 11 and the force washer 5 during mutual fastening by the nut 4 to apply the preload and, thus, prevents a moment displacement within the material of the piezoelectric force washer 5.

According to the invention, an annular gap 26 may be arranged radially between the hollow preloading shank 12 and the force washer (see FIG. 3) without having to place a centering sleeve between the hollow preloading shank and the force washer. Thus, the annular gap 26 can occupy the entire space between the hollow preloading shank 12 and the force washer 5. The external centering described can be achieved via the outer lateral surface of the force washer 5 and the head portion 11. This again serves to simplify the device and reduce manufacturing costs.

Figure 2:
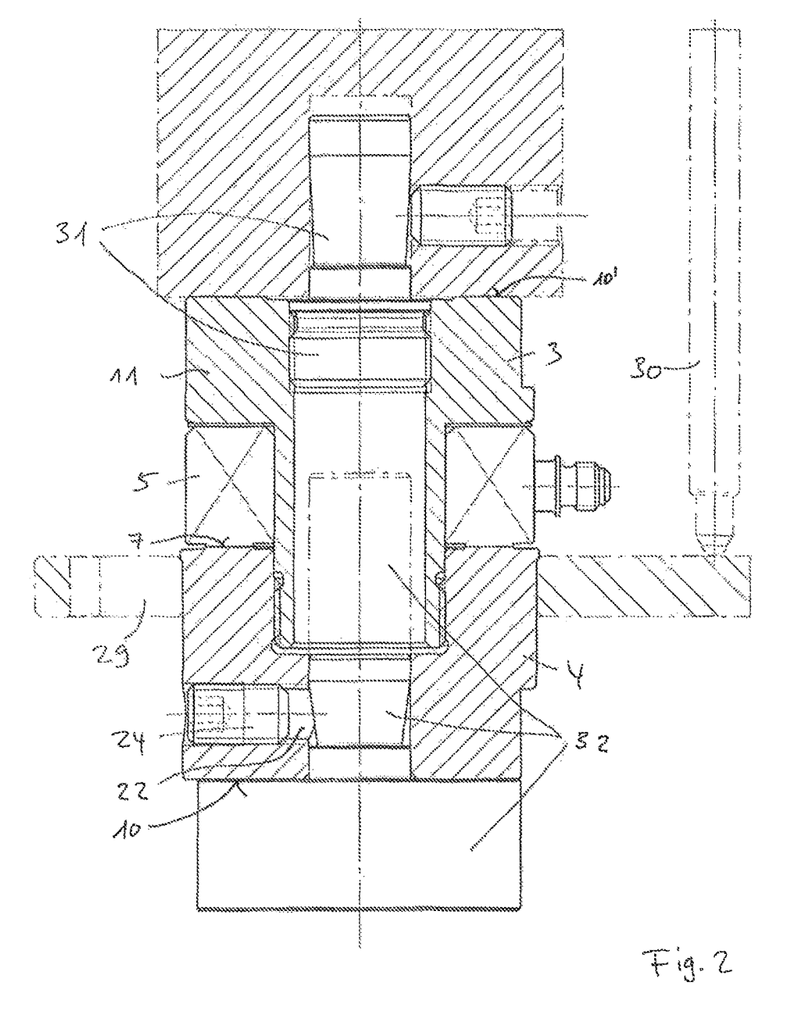
FIG. 2 shows a schematic representation of the force sensor according to the invention with locating bolt and clamping bolt attached thereto.

Because the diameter D2 of the second bore 14 of the nut 4 or the head portion 11, respectively, is smaller than the inner diameter $D_I$ of the hollow preloading shank 12, it is ensured that a locating bolt 32 can be accommodated in the second bore 14 which is much longer than the second bore, as can be seen from FIG. 2.

In addition, as shown in FIGS. 1-3 for example, the nut 4 or the head portion 11, respectively, may comprise a radial bore 22 in the central region of the second bore 14 extending from the outside up to the inner wall 15 and having an internal thread 23 into which a set screw 24 is inserted. By tightening the set screw 24, a locating bolt 32 can be fastened, as shown in FIG. 2.

Furthermore, it can be seen from FIGS. 2 and 3 that the center mount 15 in the second bore 14 must be formed at least in both end regions of the inner wall 15. The central portion of the second bore 14 is generally not required for centering since it is preferably engaged by the set screw 24. As shown in FIG. 2 for example, a locating bolt 32 in this area has a conical outer surface to provide a support for an inserted locating bolt 32 together with the set screw 24. However, as shown in FIGS. 1 and 3 for example, the two end portions 15*a* and 15*b* of the center mount 15 ensure an overall good tilt protection and, thus, provide good centering. Importantly, the length L of the second bore 14 and in particular of the center mount 15 comprising both end portions 15*a*, 15*b* and the distance thereof to each other is long, in particular at least as long as the outer diameter $D_A$ and preferably constitutes at least 20% of the axial overall height of the force sensor 1.

In particular, as shown in FIGS. 1 and 3 for example, the nut 4 may have a projection 27 in the proximity of the inner end face 7. This projection 27 serves as a boundary for the external centering described above and, as shown in FIG. 2, as a locking mechanism of a wide ring 29 that is attachable to the nut 4 on which corresponding means 30 for the determination of the axial displacement are arranged. Thus, a force/displacement measurement is possible.

Particularly, the central bore in the force sensor 1 is a throughbore. Such an arrangement allows bridging of the force sensor 1 without having to remove it to do this. Especially if means for measuring displacement are provided as shown in FIG. 2, these measurements can be continued without encountering a force shunt via the force washer 5.

In the bore formed near and extending from the upper annular bearing surface 10' of the force sensor 1, whether located (depending on the embodiment) in the head section 11 of the bolt 3 as shown in FIG. 1 or in the nut 4 as shown in FIG. 3, an internal thread 25 may be formed. This internal thread 25 allows attachment of a clamping cone 31 close to the upper bearing surface 10' for simple adaptation or attachment, respectively, of the force sensor 1 at a press 2, as shown in FIG. 4. Especially, the bore may be the bore 28 of the hollow preloading shank 12 as shown in FIG. 1 for example, or as shown in FIG. 3 for example, another bore 8' in the nut 4 extending therethrough.

Since tensile forces will also always occur during use, the force sensor 1 or force washer 5, respectively, according to the invention must also be able to withstand tensile forces. Force sensors according to the invention should withstand pressure forces up to 60 kN and/or up to 12 kN with respect to tensile forces. This means that the preload described between the bolt 3 and the nut 4 must be accordingly high.

In the Figures, the force washer 5 is depicted as being formed with a membrane 17 oriented towards the nut 4. However, it is also possible to turn the force washer 5 by 180° so that it is oriented with its membrane 17 facing the bolt 3 or the sliding disk 21, respectively.

All presently preferred embodiments described in connection with an embodiment according to FIGS. 1-3 may also be performed with a force sensor 1 of the invention according to FIG. 4. All reference numerals have the same meaning in each case to illustrate the invention.

LIST OF REFERENCE NUMERALS 1 force sensor
2 press
3 bolt
4 nut
5 force washer
6 plug connection
7 inner end face
8 first bore (of the nut)
8' another bore (in the nut)
9 internal thread of the nut
10 bearing surface
10' bearing surface
11 head portion
12 hollow preloading shank
13 external thread
14 second bore
15 inner wall, center mount
15a areas of the inner wall, centering areas
15b areas of the inner wall, centering areas
16 housing
17 membrane
18 piezoelectric measuring elements
19 inner surface, center mount
20 guiding region
21 sliding disk
22 radial bore
23 internal thread for set screw
24 set screw
25 internal thread bolt
26 annular gap
27 projection
28 bore (in the hollow preloading screw shank)
29 ring
30 means
31 clamping cone
32 locating bolt
A axis
F force
D1 diameter (inner)
$D_A$ outer diameter
D2 smaller diameter (inner)
L length
$D_I$ inner diameter of hollow preloading screw

The invention claimed is:

1. A force sensor for measuring axially occurring forces in manually operated or pneumatic presses, the force sensor comprising:

a bolt that defines a central axis extending axially through the bolt, the bolt defines a head portion that defines an upper annular surface that is normal to the central axis, the head portion defines a lower end face that is normal to the central axis and disposed opposite the upper annular surface, the bolt defines a preloading shaft connected to the head portion opposite the upper annular surface and extending axially from the lower end face of the head portion, the preloading shaft defines a frontal external thread that is disposed on the end of the preloading shaft that is opposite the end connected to the head portion, the bolt defines a throughbore extending axially through the head portion and the preloading shaft and surrounding the central axis and defining an inner diameter wherein an interior thread is defined in the portion of the throughbore extending from the upper bearing surface of the head portion and at least part way towards the preloading shaft;

a nut defines an inner end face that is normal to the central axis, the nut defines a first bore that extends axially part way through the nut from the inner end face and surrounding the central axis and having a first diameter with a first internal thread engaging the frontal external thread of the preloading shaft, the nut defines a bearing surface disposed opposite the inner end face, the nut defines an axially extending inner wall that defines a second bore extending axially part way through the nut from the bearing surface to the first bore and surrounding the central axis and having a second diameter, wherein the second diameter is smaller than the inner diameter of the hollow preloading bolt, wherein the axial length of the second bore is at least as long as the second diameter, and wherein the inner wall of the second bore is formed as a center mount for a sliding fit; and a piezoelectric force washer defines a third bore extending axially through the piezoelectric force washer about the central axis, the piezoelectric force washer defines a lower annular bearing surface and an upper annular bearing surface disposed spaced apart from the lower annular bearing surface, each of the lower annular bearing surface and the upper annular bearing surface is disposed normal to the central axis and defines an outer diameter, the piezoelectric force washer defines a plug connection that is preloaded between the upper annular bearing surface and the lower annular bearing surface, wherein the second diameter of the second bore is at least one quarter of the outer diameter of the piezoelectric force washer, and wherein the preloading shaft extends axially through the third bore to allow the first internal thread of the nut to engage the frontal external thread of the preloading shaft.

2. The force sensor according to claim 1, wherein:
the nut defines an outer wall that extends axially between the inner end face and the bearing surface,
the nut defines a radial bore extending from the outer wall through the inner wall in a central region of the second bore, and
the radial bore defines an internal thread that is configured to receive therein a set screw.

3. The force sensor according to claim 2, further comprising a set screw threaded into the radial bore.

4. The force sensor according to claim 3, wherein the bolt, the nut and the piezoelectric force washer are configured and disposed to withstand tensile forces up to 12 kN.

5. The force sensor according to claim 1, wherein the bolt, the nut and the piezoelectric force washer are configured and disposed to withstand pressure forces up to 60 kN.

6. The force sensor according to claim 1, further comprising a sliding disk disposed between the piezoelectric force washer and the head portion of the bolt and fixed by the preload between the bolt and the nut.

7. A force sensor for measuring axially occurring forces in manually operated or pneumatic presses, the force sensor comprising:
a bolt that defines a central axis extending axially through the bolt, the bolt defines a head portion that defines an upper annular surface that is normal to the central axis, the head portion defines a lower end face that is normal to the central axis and disposed opposite the upper annular surface, the bolt defines a preloading shaft connected to the head portion opposite the upper annular surface and extending axially from the lower end face of the head portion, the preloading shaft defines a frontal external thread that is disposed on the end of the preloading shaft that is opposite the end connected to the head portion, the bolt defines a throughbore extending axially through the head portion and the preloading shaft and surrounding the central axis and defining an inner diameter;
a nut defines an inner end face that is normal to the central axis, the nut defines a first bore that extends axially part way through the nut from the inner end face and surrounding the central axis and having a first diameter with a first internal thread engaging the frontal external thread of the preloading shaft, the nut defines a bearing surface disposed opposite the inner end face, the nut defines an axially extending inner wall that defines a second bore extending axially part way through the nut from the bearing surface to the first bore and surrounding the central axis and having a second diameter, wherein the second diameter is smaller than the inner diameter of the hollow preloading bolt, wherein the axial length of the second bore is at least as long as the second diameter, and wherein the inner wall of the second bore is formed as a center mount for a sliding fit, wherein: the nut defines an outer wall that extends axially between the inner end face and the bearing surface, the nut defines a radial bore extending from the outer wall through the inner wall in a central region of the second bore, and the radial bore defines an internal thread that is configured to receive therein a set screw; and
a piezoelectric force washer defines a third bore extending axially through the piezoelectric force washer about the central axis, the piezoelectric force washer defines a lower annular bearing surface and an upper annular bearing surface disposed spaced apart from the lower annular bearing surface, each of the lower annular bearing surface and the upper annular bearing surface is disposed normal to the central axis and defines an outer diameter, the piezoelectric force washer defines a plug connection that is preloaded between the upper annular bearing surface and the lower annular bearing surface, wherein the second diameter of the second bore is at least one quarter of the outer diameter of the piezoelectric force washer, and wherein the preloading shaft extends axially through the third bore to allow the first internal thread of the nut to engage the frontal external thread of the preloading shaft.

8. The force sensor according to claim 7, further comprising a set screw threaded into the radial bore.

9. A force sensor for measuring axially occurring forces in manually operated or pneumatic presses, the force sensor comprising:
a bolt that defines a central axis (a) extending axially through the bolt, the bolt defines an outer diameter disposed radially from the central axis, the bolt defines an upper annular surface that is normal to the central axis, the bolt includes a head that defines a lower end face spaced axially from the upper annular surface;
a nut that defines an inner end face disposed facing the lower end face of the bolt, the nut defines a first bore having a first diameter with an internal thread, the nut defines a lower annular bearing surface, wherein a first section of the internal thread of the nut extends axially part way through the nut from the inner end face toward the lower annular bearing surface, and a second section of the internal thread of the nut extends axially part way through the nut from the lower annular bearing surface toward the inner end face; and
a piezoelectric force washer preloaded between the bolt and the nut and including a plug connector, the piezoelectric force washer defining an opening extending axially through the piezoelectric force washer; and
wherein the bolt has a preloading shaft that defines a frontal external thread extending axially through the opening of the piezoelectric force washer and engaging the first section of the internal thread of the nut,
wherein the head of the bolt includes an axially extending inner wall that defines a second bore with a second diameter and that extends axially through the bolt from at least the upper annular surface toward the lower end face over a length that is at least equal to the diameter of the second bore, the diameter of the second bore being at least one quarter of the outer diameter of the bolt, and
wherein the inner wall of the second bore is formed as a center mount for a sliding fit.

10. The force sensor according to claim 9, wherein the bolt in the second bore near the head portion also has an inner surface formed as a center mount for a sliding fit.

11. The force sensor according to claim 9, further comprising a sliding disk disposed between the piezoelectric force washer and the head portion of the bolt and fixed by the preload between the bolt and the nut.

12. The force sensor according to claim 9 wherein the bolt adjacent to the external thread facing the head portion has a guiding region that is at least as wide as the external thread and is accommodated in a centered manner in the proximity of the inner end face into the center mount of the first bore.

13. The force sensor according to claim 9, wherein:
the head defines an outer wall that extends axially between the lower end face and the upper annular surface,
the head defines a radial bore extending radially from the outer wall through the inner wall in a central region of the second bore, and
the radial bore defines an internal thread that is configured to receive therein a set screw.

14. The force sensor according to claim 13, further comprising a set screw threaded into the radial bore.

15. The force sensor according to claim 14, wherein the bolt, the nut and the piezoelectric force washer are configured and disposed to withstand tensile forces up to 12 kN.

16. The force sensor according to claim 9, wherein an annular gap is formed radially between the preloading bolt and the piezoelectric force washer.

17. The force sensor according to claim 9, wherein the nut has a projection in the proximity of the inner end face.

18. The force sensor according to claim 9, wherein the bolt, the nut and the piezoelectric force washer are configured and disposed to withstand pressure forces up to 60 kN.

19. A force sensor for measuring axially occurring forces in manually operated or pneumatic presses, the force sensor comprising:

a bolt that defines a central axis extending axially through the bolt, the bolt defines an outer diameter disposed radially from the central axis, the bolt defines an upper annular surface that is normal to the central axis, the bolt includes a head that defines a lower end face spaced axially from the upper annular surface, wherein the head includes an axially extending inner wall that defines a second bore with a second diameter and that extends axially through the bolt from at least the upper annular surface toward the lower end face over a length that is at least equal to the diameter of the second bore, the diameter of the second bore being at least one quarter of the outer diameter of the bolt, wherein the inner wall of the second bore is formed as a center mount for a sliding fit; wherein: the head defines an outer wall that extends axially between the lower end face and the upper annular surface, the head defines a radial bore extending radially from the outer wall through the inner wall in a central region of the second bore, and the radial bore defines an internal thread that is configured to receive therein a set screw;

a nut that defines an inner end face disposed facing the lower end face of the bolt, the nut defines a lower annular bearing surface; the nut defines a first bore having a first diameter with an internal thread and extending axially part way through the nut from the inner end face toward the lower annular bearing surface; and a piezoelectric force washer preloaded between the bolt and the nut and including a plug connector, the piezoelectric force washer defining an opening extending axially through the piezoelectric force washer; and wherein the bolt has a reloading shaft that defines a frontal external thread extending axially through the opening of the piezoelectric force washer and engaging the internal thread of the nut.

20. The force sensor according to claim 19, further comprising a set screw threaded into the radial bore.

* * * * *